United States Patent
Knoepfler

(10) Patent No.: US 7,165,967 B2
(45) Date of Patent: Jan. 23, 2007

(54) METHOD FOR REMOVING INJECTION-MOULDED PARTS FROM AN INJECTION-MOULDING MACHINE AND INJECTION-MOULDING MACHINE WITH A HANDLING SYSTEM

(75) Inventor: Kurt G. Knoepfler, Eching (DE)

(73) Assignee: Hekuma GmbH, Eching (DE)

( * ) Notice: Subject to any disclaimer, the term of this patent is extended or adjusted under 35 U.S.C. 154(b) by 129 days.

(21) Appl. No.: 10/663,374

(22) Filed: Sep. 16, 2003

(65) Prior Publication Data
US 2004/0113321 A1    Jun. 17, 2004

(30) Foreign Application Priority Data
Sep. 17, 2002    (DE) ................. 102 43 130

(51) Int. Cl.
*B29C 45/42*    (2006.01)
(52) U.S. Cl. ....................... 425/556; 425/444
(58) Field of Classification Search ................ 425/444, 425/556
See application file for complete search history.

(56) References Cited

U.S. PATENT DOCUMENTS

| | | | |
|---|---|---|---|
| 3,209,409 A | 10/1965 | Grathwohl | |
| 3,583,888 A | 6/1971 | Shanklin | |
| 3,796,455 A | 3/1974 | Linkbom | |
| 3,804,568 A | 4/1974 | Rees | |
| 4,121,402 A * | 10/1978 | Cress et al. | 53/452 |
| 4,544,519 A * | 10/1985 | Schilke | 264/328.1 |
| 4,721,452 A | 1/1988 | Delfer, III | |
| 5,318,429 A | 6/1994 | Butlin et al. | |
| 5,354,194 A | 10/1994 | Kresak | |
| 5,518,387 A | 5/1996 | Di Simone | |

(Continued)

FOREIGN PATENT DOCUMENTS

DE    27 53 337    1/1979

(Continued)

OTHER PUBLICATIONS

Donal V. Rosato; Injection Molding Handbook, 1995, Champan & Hall, New York pp. 282-285.

(Continued)

*Primary Examiner*—Joseph S. Del Sole
*Assistant Examiner*—Maria Veronica Ewald
(74) *Attorney, Agent, or Firm*—Knobbe, Martens, Olson & Bear LLP

(57) ABSTRACT

A multi-daylight mould moulding machine with more than two parting planes removes parts between a number of mould halves and transfers parts onto a conveying device, in which an arm of a removal device moves into a parting plane between opened mould halves. Parts are removed from mould cavities of a mould half and transferred to a transfer device, which deposits the parts on a conveying path. Parts in all the parting planes are removed simultaneously by a removal device, which has arms corresponding in their number to the number of parting planes. The removal device is moved into a first transfer position, parts from one group of arms are deposited by a transfer unit on a first conveying path and then moved into at least a second transfer position where parts from a further group of arms are deposited by a further transfer unit on a second conveying path.

9 Claims, 3 Drawing Sheets

U.S. PATENT DOCUMENTS

| | | | |
|---|---|---|---|
| 5,614,146 A | 3/1997 | Nakamura et al. | |
| 5,772,049 A | 6/1998 | Randone | |
| 6,042,364 A | 3/2000 | Nishida | |
| 6,071,454 A | 6/2000 | Shimizu et al. | |
| 6,086,808 A | 7/2000 | Sorensen et al. | |
| 6,280,665 B1 | 8/2001 | Kotzab | |
| 6,398,537 B1 | 6/2002 | Matysek | |
| 6,463,999 B1 | 10/2002 | Jung | |
| 6,471,505 B1 * | 10/2002 | Herbst | 425/556 |
| 2002/0071882 A1 | 6/2002 | Furuhata | |

FOREIGN PATENT DOCUMENTS

| | | |
|---|---|---|
| DE | 37 26 653 | 2/1989 |
| DE | 38 30 210 | 3/1990 |
| DE | G 94 02 931.8 | 7/1994 |
| DE | G 94 02 931.8 U1 | 7/1994 |
| DE | G 94 19 474.2 U1 | 3/1995 |
| DE | 296 06 853 | 8/1996 |
| DE | 196 53 778 | 6/1998 |
| DE | 197 49 245 | 6/1999 |
| DE | 199 15 770 | 11/1999 |
| EP | 0 358 104 | 3/1990 |
| EP | 0 395 585 | 10/1990 |
| EP | 0 669 194 | 8/1995 |
| EP | 0 718 084 | 6/1996 |
| EP | 0 858 870 | 8/1998 |
| EP | 0 903 213 | 3/1999 |
| EP | 1 092 524 | 4/2001 |
| EP | 1 174 242 | 7/2001 |
| FR | 2 071 797 | 9/1971 |
| GB | 451507 | 8/1936 |
| JP | 9052261 | 2/1997 |
| JP | 10119088 | 5/1998 |
| JP | 2000192842 | 7/2000 |
| JP | 2002 11682 | 1/2002 |
| WO | WO 97/28944 | 8/1997 |
| WO | WO 01/62447 | 8/2001 |

OTHER PUBLICATIONS

"Im Doppelpack auf Rationalisierungskurs" von Dipl.-Ing. Bernd Johannson; Apr. 1997; pp. 12-15 (English translation also attached).

* cited by examiner

METHOD FOR REMOVING INJECTION-MOULDED PARTS FROM AN INJECTION-MOULDING MACHINE AND INJECTION-MOULDING MACHINE WITH A HANDLING SYSTEM

RELATED APPLICATIONS

This application claims the benefit of the German application 102 43 130.2 filed Sep. 17, 2002 which is incorporated herein in its entirety by reference.

BACKGROUND OF THE INVENTION

1. Field of the Invention

The invention relates to a method for removing injection-moulded parts from an injection-moulding machine and transferring the injection-moulded parts onto a conveying device, an arm of a removal device being made to move into a parting plane between opened mould halves, the injection-moulded parts being removed from mould cavities of a mould half and transferred from the injection-moulding machine to a transfer device, which takes over the injection-moulded parts from the removal device and deposits them on a conveying path. The invention also relates to an injection-moulding machine with a handling system for injection-moulded parts, comprising an arm of a removal device, which can be made to move into and out of a parting plane between opened mould halves, and a transfer device, which takes over the removed injection-moulded parts from the arm of the removal device and deposits them on a conveying path.

2. Description of the Related Art

EP 1 092 524 A1 discloses a handling system for a plastics injection-moulding machine in which an arm of a removal device is made to move between the opened mould halves of the injection-moulding machine in order to remove the injection-moulded parts, whereupon the latter are transferred to a transfer device, which takes over the injection-moulded parts from the arm of the removal device and deposits them on a conveyor belt.

SUMMARY OF THE INVENTION

The invention is based on the object of forming a method and a device of the type stated at the beginning in such a way that an increase in capacity in the production of injection-moulded parts is achieved.

In one embodiment, the invention is a method for removing injection-moulded parts from an injection-moulding machine and transferring the injection-moulded parts onto a conveying device, an arm of a removal device being made to move into a parting plane between opened mould halves, the injection-moulded parts being removed from mould cavities of a mould half and transferred from the injection-moulding machine to a transfer device, which takes over the injection-moulded parts from the removal device and deposits them on a conveying path, the method comprising providing an injection-moulding machine with a multi-daylight mould which has more than two parting planes between a number of mould halves, simultaneously removing the injection-moulded parts in all the parting planes by means of a removal device, which has arms which correspond in their number to the number of parting planes, moving the removal device into a first transfer position, in which the injection-moulded parts from one group of arms are deposited by a transfer unit on a first conveying path, and further moving the removal device into at least a second transfer position, in which the injection-moulded parts from a further group of arms are deposited by a further transfer unit on a second conveying path.

By providing an injection-moulding machine with more than two parting planes of a multi-daylight mould, a large number of injection-moulded parts can be produced simultaneously in one injection-moulding operation, the transfer of the injection-moulded parts simultaneously removed from all the parting planes to at least two transfer units which are arranged offset in relation to one another or can be made to move into an offset position also allowing the depositing of the relatively large number of removed injection-moulded parts to be performed quickly and without any great space requirement.

Another embodiment of the invention is an injection-moulding machine with a handling system for injection-moulded parts, comprising an arm of a removal device, which can be made to move into and out of a parting plane between opened mould halves, and a transfer device, which takes over the removed injection-moulded parts from the arm of the removal device and deposits them on a conveying path, wherein the injection-moulding machine comprises a multi-daylight mould with more than two parting planes between a number of mould halves and wherein the removal device has a number of arms corresponding to the number of parting planes of the multi-daylight mould, at least two transfer devices arranged offset in relation to one another, and at least two conveying paths which lie next to one another and are assigned to the transfer units. An injection-moulding machine with more than two parting planes of a multi-daylight mould is provided together with a handling system, the removal device of which has arms which correspond in their number to the number of parting planes, with the provision of transfer units which are arranged or can be moved offset in relation to one another and in each case have two transfer arms or plates, which respectively take over the injection-moulded parts from two arms of the removal device and deposit them on assigned conveying paths. As a result of the fact that the removal device is moved successively into two transfer stations, for each transfer station two transfer plates for depositing the injection-moulded parts on the conveying path can be pivoted in such a way that they do not hinder one another. As a result, a compact configuration of the handling system is achieved overall and the handling sequence is made possible within a very short cycle time, dispensing with the need for additional transfer stations. These and other objects and advantages of the invention will be more apparent from the following description taken in conjunction with the accompanying drawings.

BRIEF DESCRIPTION OF THE DRAWINGS

The invention is explained in more detail by way of example on the basis of the drawings, in which.

DETAILED DESCRIPTION OF THE PREFERRED EMBODIMENT

Figure 1:
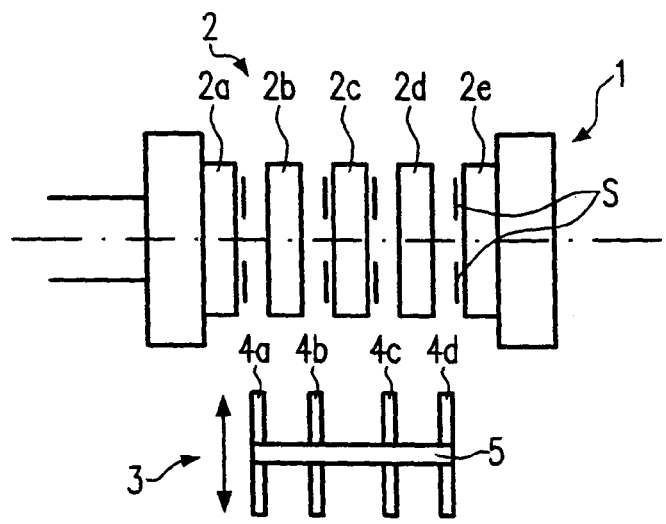
FIG. 1 schematically shows in a plan view an embodiment of an injection-moulding machine with four parting planes of the multi-daylight mould and schematically shows a handling system, FIG. 1a schematically shows the stations of a removal device.
Figure 2:
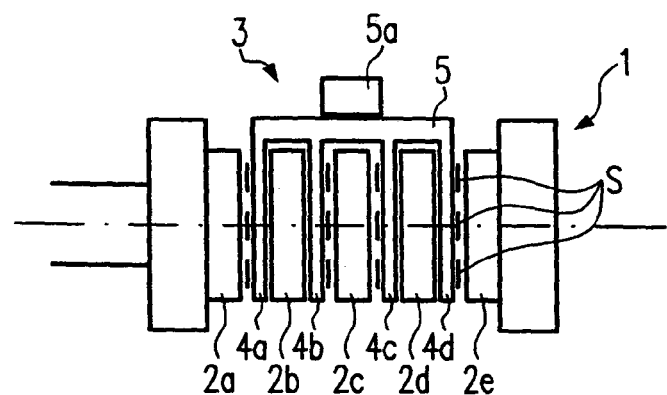
FIG. 2 shows a side view of the handling system from FIG. 1 with an injection-moulding machine, FIG. 3 schematically shows in a side view the pivoting operation of two transfer plates of a transfer unit.
Figure 6:
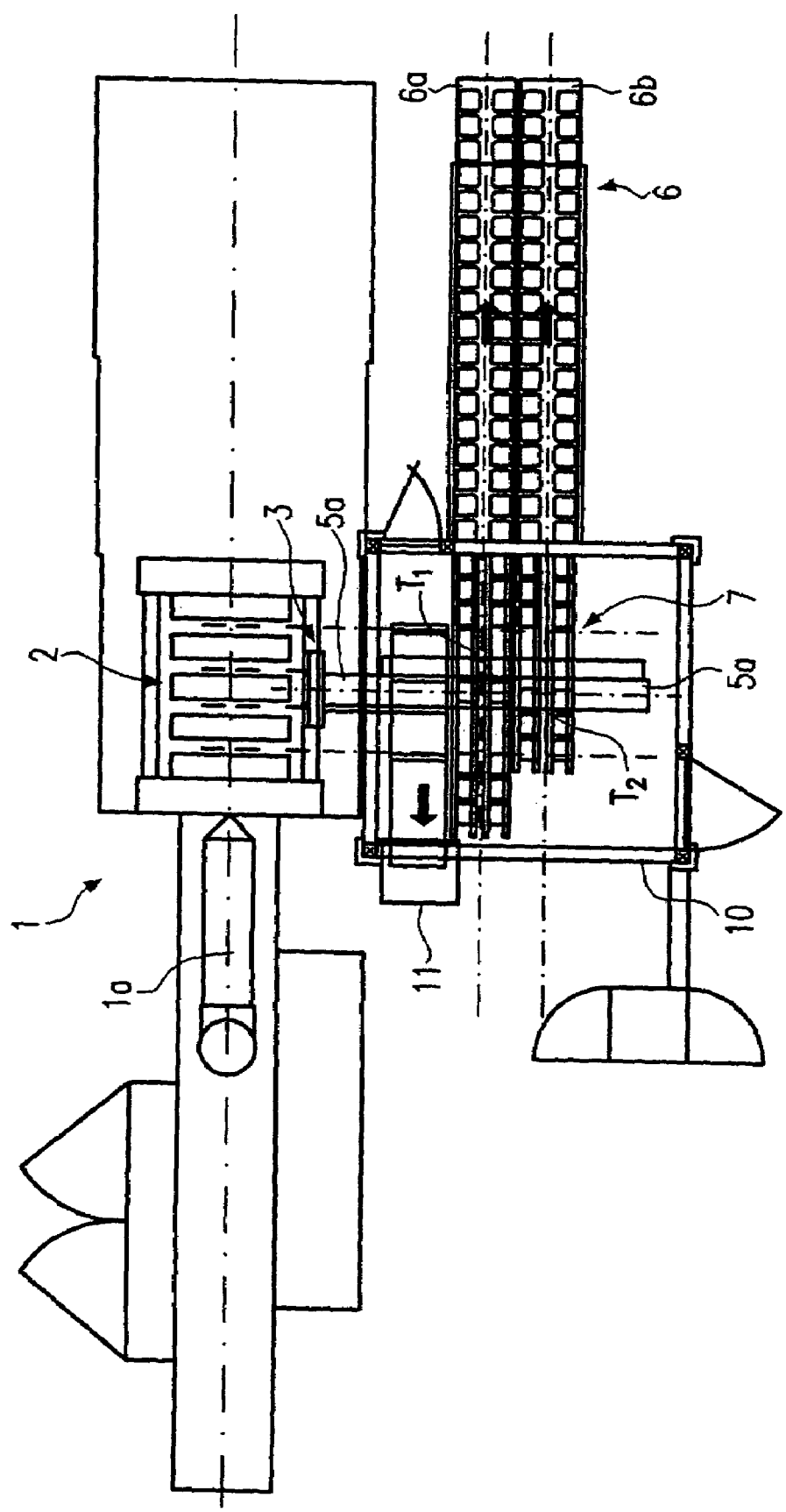
FIG. 6 shows in a plan view an embodiment of a handling system on an injection-moulding machine corresponding to FIG. 1.

In FIG. 1, an injection-moulding machine is denoted generally by 1 and, in the case of the exemplary embodiment represented, has a multi-daylight mould 2 with four parting planes, which lie between the sides of five mould halves 2a to 2e. Formed on each mould half are mould cavities for a number of injection-moulded parts, for example in the case of the exemplary embodiment represented, eight mould cavities. By the injection-moulding device 1a schematically indicated in FIG. 6, plastic is injected through the individual elements of the closed multi-daylight mould 2 into the mould cavities in the four parting planes, whereupon the mould halves are moved apart, so that the four parting planes between the respective mould halves are open for the removal of the injection-moulded parts, as is represented in FIGS. 1, 2 and 6. The injection-moulded parts S, indicated by a short line, are located in the case of the exemplary embodiment represented on the sides of the mould halves 2a, 2c and 2e, the injection-moulded parts on the middle mould half 2c being positioned on both sides.

Figure 1A:

3 denotes a removal device, which is arranged next to the injection-moulding machine and, in a way corresponding to the number of parting planes, has in this embodiment four arms 4a to 4d, which are arranged on a common carrier 5, which can be made to move on a guide 5a lying transversely in relation to the longitudinal axis of the injection-moulding machine (FIG. 6) and from which the arms 4a to 4d protrude downwards in the manner of a comb, as FIG. 2 shows. In FIG. 1, the removal device 3 is reproduced in a starting position A (FIG. 1a) next to the injection-moulding machine 1, which it assumes during the injection-moulding operation with the multi-daylight mould 2 closed. As soon as the multi-daylight mould 2 is opened, the carrier 5 with the arms 4a to 4d is made to move into a removal position E (FIG. 1a) in a horizontal direction between the opened mould halves, whereupon the injection-moulded parts S are removed from the mould cavities by grippers known per se on the arms and are securely held on the arms 4a to 4d.

The removal device 3 is then moved back from the removal position E into a first transfer station $T_1$ (FIG. 1a) over a conveying path 6a, arranged over which in the case of the exemplary embodiment represented are two transfer plates 7a and 7b of a transfer device 7, which interact with the assigned arms 4a and 4b of the removal device 3 in such a way that the injection-moulded parts S held on the arms 4a and 4b are taken over by the transfer plates 7a and 7b. Immediately after that, the removal device 3 is made to move into a second transfer station $T_2$ over a conveying path 6b, arranged over which are likewise two transfer plates 7c and 7d, which interact with the arms 4c and 4d of the removal device and take over the injection-moulded parts S from these arms.

The removal device 3 can be made to move from the second transfer position $T_2$ back again into the starting position A, reproduced in FIG. 1, or—if in the meantime an injection-moulding operation has already ended—made to move directly into the removal position E between the opened mould halves, in order once again to remove a set of injection-moulded parts S from the multi-daylight mould 2.

Since a pivoting movement of the transfer plates from the vertical takeover position into a horizontal transfer position is performed on the transfer device 7, the transfer device is subdivided into at least two units, which are arranged offset next to one another and respectively have two transfer arms or transfer plates, which perform a pivoting movement of approximately 90° in such a way that they do not hinder one another.

With parting planes of the multi-daylight mould lying relatively close to one another, the transfer units have at most two transfer plates, because with close positioning of the transfer plates only two transfer plates can be pivoted or tilted in such a way that they do not hinder one another. The transfer plates themselves may have individual arms which are arranged on a common carrier, so that these arms are jointly pivoted or tilted in the manner of a plate.

Figure 3:
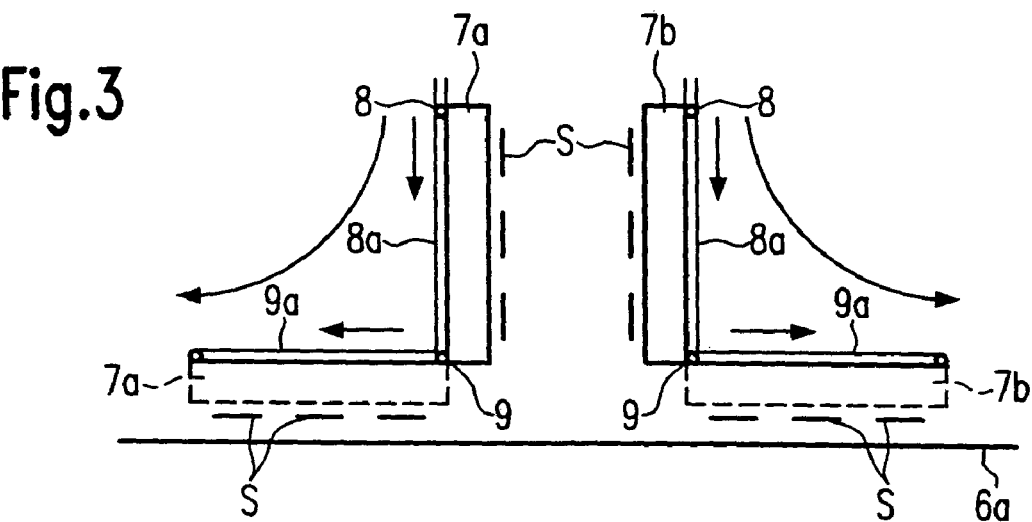

FIG. 3 shows an exemplary embodiment of pivotable transfer plates 7a and 7b over the conveying path 6a in a side view. The individual transfer plates are in each case mounted pivotably on the upper and lower edges at 8 and 9 in a guide 8a and 9a, respectively. An actuating device allows the lower point of articulation 9 to be displaced along the horizontal guide 9a, with the upper point of articulation 8 at the same time being moved downwards in the vertical guide 8a, so that the transfer plate is transferred into a horizontal transfer position, which is represented in FIG. 3 by dashed lines, by a pivoting movement along the curved arrow. In this horizontal transfer position, the individual injection-moulded parts S can be deposited on the assigned conveying path, for example a conveyor belt. EP 1 092 524 A1 describes in detail the configuration of a pivotable transfer plate of this type.

Figure 4:
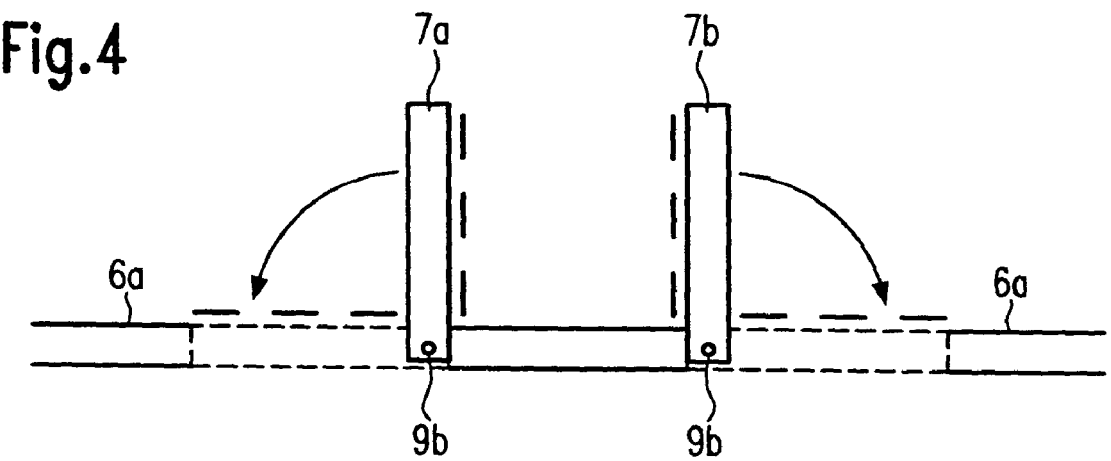
FIGS. 4 and 5 show variants of transfer units.

However, it is also possible to provide a different configuration, in which for example the two transfer plates are merely tilted by an actuating device in such a way that they do not hinder one another, as FIG. 4 schematically shows, whereby the transfer arms 7a, 7b, which can be pivoted about a point of articulation 9b, pass through the conveying device.

In the case of the configuration according to FIG. 4, the transfer plates 7a and 7b may also be turned through 180° about a vertical axis, so that the injection-moulded parts S lie on the outside against the upright transfer plates before a tilting movement takes place into the plane of the conveying path.

Figure 5:
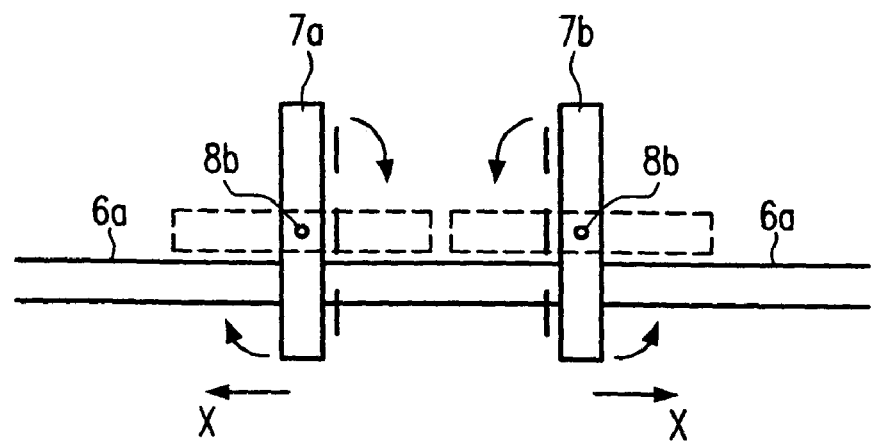

FIG. 5 shows a further variant of an embodiment, in which the transfer plates are pivoted about a central pivoting point 8b. In this case, the transfer plates 7a, 7b can be pivoted next to the assigned conveying path and then made to move in the horizontal position over the conveying path, it also being possible for the transfer plates to be moved apart in the direction of the arrows X. According to a further modification, the transfer plates or arms 7a, 7b in FIG. 5 are turned anticlockwise, whereby they pass through the conveying device.

As a result of the fact that the transfer device 7 in the case of the exemplary embodiment with four parting planes is subdivided into two units, each of which has two transfer plates, the transfer plates of the entire transfer device can be pivoted without hindering one another. In this case, the transfer plates 7a and 7b of the first transfer unit can begin their pivoting movement already while the removal device 3 is being moved into the second transfer station $T_2$, in which the injection-moulded parts on the arms 4c and 4d are being transferred to the transfer plates 7c and 7d. The guide 5a of the carrier 5 of the removal device 3 is arranged over the multi-daylight mould 2 and over the transfer device 7, as FIG. 2 shows, so that the overlapping movement sequences between the adjusting movement of the removal device 3 transversely in relation to the longitudinal axis of the injection-moulding machine and transversely in relation to the conveying paths 6a, 6b and the pivoting movement of the transfer plates are not hindered.

In the case of an injection-moulding machine with three parting planes between the mould halves, a removal device 3 with three arms is provided, which arms interact with, for example, two transfer plates 7a and 7b on the first conveying path 6a, while the third arm of the removal device transfers the injection-moulded parts to an individual transfer plate on the second conveying path 6b. In the case of such a configuration, the removal device 3 may also interact only with one transfer plate in the first transfer station $T_1$ and with two transfer plates in the second transfer station $T_2$.

In a corresponding way, with more than four parting planes of the multi-daylight mould 2, a third transfer station is provided over a third conveying path, on which one or two transfer plates of a transfer unit are positioned.

FIG. 1 schematically shows two conveying paths 6a and 6b that are separate from one another. In practice, a single conveyor belt on which the injection-moulded parts are deposited in adjacent rows may be provided for this purpose.

In the case of the embodiment described, the transfer device is subdivided into two units that are stationary with regard to their positioning. It is also possible, however, to form the transfer device in such a way that it can be made to move, the transfer plates or arms 7a to 7d being able to be arranged in a row in order to take over the injection-moulded parts simultaneously from all the arms 4a to 4d of the removal device 3, whereupon in each case two transfer plates are made to move into the position reproduced in FIG. 1 over the conveying paths or only one transfer unit with the two plates 7c and 7d is made to move over the second conveying path 6b when the takeover over the first conveying path 6a has been performed. In the case of such a configuration, the removal device 3 is moved into a single transfer station T next to or over the conveying path 6a, whereupon, after the transfer of the injection-moulded parts, the removal device 3 can be made to move back again into the starting position A while one or both transfer units are being moved transversely in relation to the running direction of the conveying path into the transfer stations $T_1$ and $T_2$.

Instead of the grouping of the transfer plates reproduced in FIG. 1, into two units with the transfer plates 7a, 7b and 7c, 7d, the transfer unit arranged over the conveying path 6a may also comprise the transfer plates 7a and 7c lying further apart, while the second transfer unit comprises the transfer plates 7b and 7d over the second conveying path 6b. This is expedient for example whenever the injection-moulded parts are positioned differently than schematically represented in FIG. 1 on the sides of the mould halves during removal. With transfer units which can be made to move transversely in relation to the conveying path, a corresponding grouping of the transfer plates can be performed. For example, the first transfer plate 7a and the fourth transfer plate 7d may also form a transfer unit over the conveying path 6a, while the transfer unit over the conveying path 6b is formed by the transfer plates 7b and 7c.

According to another embodiment, in the case of the exemplary embodiment with four parting planes, the removal device 3 itself may be subdivided into two units, the first unit transferring the injection-moulded parts to a first transfer unit while the second unit of the removal device 3 is being moved into the second transfer position, in which the injection-moulded parts on the arms concerned are transferred into the second transfer unit. While returning, the two units of the removal device 3 may be arranged again in line with one another in a row, for example in the starting station A, so that they can remove the injection-moulded parts from the opened multi-daylight mould in all four parting planes simultaneously.

The arrangement of the injection-moulded parts on the individual mould halves may be formed in various ways. The arrangement represented in two rows with three injection-moulded parts in each case is merely given by way of example.

In a corresponding way, a pivoting movement of the individual transfer plates other than that represented may also be provided on the transfer device 7. For example, the transfer plates that are upright during the takeover of the injection-moulded parts may be pivoted directly over the conveying path by an actuating device, without the transfer plates being guided in a guide 8a, 9a or pivoted about a pivoting point. In this case, the individual transfer plates of a transfer unit may be pivoted or turned oppositely or else in the same direction.

On the injection-moulding machine itself, a single injection-moulding operation or else a multiple injection-moulding operation may be performed. This has no influence on the described form taken by the removal and transfer of the injection-moulded parts onto a conveying path.

FIG. 6 shows in a plan view the handling system in a frame or housing 10, which is positioned next to the injection-moulding machine 1 and is passed through by a conveyor belt 6 with a total of four tracks. At 11, a path by which damaged injection-moulded parts can be segregated is provided.

The described division of the transfer device into transfer units which are arranged offset in relation to one another or can be made to move into offset positions is applicable not only in the case of a horizontally movable removal device, but also in the case of a Cartesian removal device with a vertical axis, in which the removal device is movable in three directions.

Although the foregoing description of the preferred embodiment of the present invention has shown, described, and pointed out the fundamental novel features of the invention, it will be understood that various omissions, substitutions, and changes in the form of the detail of the apparatus as illustrated, as well as the uses thereof, may be made by those skilled in the art without departing from the spirit of the present invention.

What is claimed is:

1. An injection-moulding machine with a handling system for injection-moulded parts, comprising:
    a multi-daylight mould with more than two parting planes between a number of mould halves;
    a removal device comprising a number of arms corresponding to the number of parting planes of the multi-daylight mould and a common carrier on which the arms are arranged and which can be moved such that the arms move into and out of the more than two parting planes;
    at least two transfer units arranged offset in relation to one another and which take over removed injection moulded parts from the arms of the removal device; and
    at least two conveying paths which lie next to one another and are assigned to the transfer units wherein the removal device is movable into a first transfer position, in which the injection-moulded parts from one group of arms are deposited by a first transfer unit on a first conveying path and further movable into at least a second transfer position, and in which the injection-moulded parts from a further group of arms are deposited by a second transfer unit on a second conveying path.

2. The injection moulding machine of claim 1, wherein the transfer units comprise pivotable transfer plates which can be pivoted by an actuating device through approximately 90° into a transfer position.

3. The injection moulding machine of claim 1, further comprising a guide engaged with the common carrier such that the common carrier moves along the guide.

4. The injection moulding machine of claim 3, wherein the guide extends over the multi-daylight mould or outside the latter and over the transfer units transversely in relation to a longitudinal axis of the injection-moulding machine and the direction of movement of the conveying paths, and wherein the arms of the removal device protrude downwards from the guide.

5. The injection moulding machine of claim 1, wherein the removal device is configured such that the arms translate longitudinally into and out of the more than two parting planes.

6. An injection-moulding machine with a handling system for injection-moulded parts, comprising:
   a multi-daylight mould with more than two parting planes between a number of mould halves;
   a removal device comprising a number of arms corresponding to the number of parting planes of the multi-daylight mould;
   at least two transfer units arranged offset in relation to one another and which take over removed injection moulded parts from the arms of the removal device; and
   at least two conveying paths arranged adjacent one another and which are assigned to the transfer units wherein the removal device is adapted to move to a removal position, wherein the injection-moulded parts are taken from the mould, and to transfer positions, whereat the individual transfer units transfer respective injection moulded parts to a respective allocated conveying path.

7. The injection moulding machine of claim 6, further comprising a guide engaged with the common carrier such that the common carrier moves along the guide.

8. The injection moulding machine of claim 6, wherein the removal device is configured such that the arms translate longitudinally into and out of the more than two parting planes.

9. The injection moulding machine of claim 6, wherein the transfer units comprise pivotable transfer plates which can be pivoted by an actuating device through approximately 90° into a transfer position.

* * * * *